United States Patent [19]

Pomonik et al.

[11] E Patent Number: Re. 33,434

[45] Reissued Date of Patent: Nov. 13, 1990

[54] RAPIDLY INSTALLABLE MOORING AND CARGO SYSTEM

[75] Inventors: George M. Pomonik, Calabases; Martin B. Jansen, Agoura Hills, both of Calif.

[73] Assignee: Amtel, Inc., Calabasas, Calif.

[21] Appl. No.: 478,706

[22] Filed: Feb. 8, 1990

Related U.S. Patent Documents

Reissue of:

[64] Patent No.: 4,573,425
Issued: Mar. 4, 1986
Appl. No.: 72,353
Filed: Sep. 4, 1979

U.S. Applications:

[63] Continuation of Ser. No. 164,402, Mar. 4, 1988, abandoned.

[51] Int. Cl.[5] ..... B63B 21/00

[52] U.S. Cl. ..... 114/230; 114/26; 114/294; 441/5; 441/32

[58] Field of Search ..... 405/195, 202, 203–210; 114/125, 230, 256, 257, 294, 295, 300, 315, 322, 323, 330, 333, 50, 51, 26; 441/1, 3–5, 10, 32; 137/236.1, 615

[56] References Cited

U.S. PATENT DOCUMENTS

| | | | |
|---|---|---|---|
| 1,021,818 | 4/1912 | Bell | 114/50 |
| 2,534,480 | 12/1950 | Shannon | 405/203 |
| 3,118,416 | 1/1964 | Sawyer | 405/205 |
| 3,708,811 | 1/1973 | Flory | 441/5 |
| 3,774,253 | 11/1973 | Lecompte | 441/4 |
| 3,840,927 | 10/1974 | Reid | 441/5 |
| 3,890,796 | 6/1975 | Kruger et al. | 114/50 |
| 4,065,822 | 1/1978 | Wilbourn | 114/230 |
| 4,152,088 | 5/1979 | Vilain | 405/203 |

*Primary Examiner*—Joseph F. Peters, Jr.
*Assistant Examiner*—Stephen P. Avila
*Attorney, Agent, or Firm*—Burns, Doane, Swecker & Mathis

[57] ABSTRACT

A system which can be set up in emergencies to moor an offloading vessel and transfer oil between it and a seabed pipeline, as to remove oil from a grounded tanker or to deliver fuel to the shore under hostile or emergency conditions. The system includes a barge containing a fluid swivel as well as a mooring buoy and buoy-holding chain. The barge can be towed to a desired location and pipes and hoses connected to the fluid swivel, and the barge then can be sunk to the seabed. Upon sinking, the barge is already connected to the seabed pipeline and to hoses that extend from the barge to the sea surface to connect to an offloading vessel, as well as being connected through a chain to a buoy floating at the sea surface which has a hawser for mooring the vessel. A vessel can be utilized to tow out the seabed pipeline, to facilitate installation of the pipeline as to enable connection of the pipeline to the fluid swivel on the barge prior to sinking the barge.

6 Claims, 2 Drawing Sheets

RAPIDLY INSTALLABLE MOORING AND CARGO SYSTEM

Matter enclosed in heavy brackets [ ] appears in the original patent but forms no part of this reissue specification; matter printed in italics indicates the additions made by reissue.

*This application is a continuation of application Ser. No. 07/164,402, filed Mar. 4, 1988, now abandoned for reissue of U.S. Pat. No. 4,573,425 issued Mar. 4, 1986.*

BACKGROUND OF THE INVENTION

One type of mooring and cargo transfer system includes a buoy anchored to the sea bed to moor a vessel an a fluid swivel which can be located near the sea floor to connect a seabed pipeline to a hose structure extending up to the moored vessel. The fluid swivel and a swivel joint on the buoy permit the vessel to drift in rotation without limit about the installation, while oil flows through the hose structure between the pipeline and vessel. In a typical installation of this type, the various parts of the system are brought to the mooring site and installed with the aid of divers. Considerable expense and time is involved in readying the various components of the system at a shipyard or the like, operating vessels with large cranes or other equipment-handling facilities at the offshore site, and supporting the various personnel, including deep sea divers, to assemble a heavy duty system.

Emergency situations can arise where offshore mooring and oil transfer installations would be very useful, if only they could be set up very rapidly. In one example, where a tanker runs aground and begins leaking oil, a temporary offshore installation can be useful to transfer the oil from the damaged tanker to an empty offloading tanker, in a single or multiple operations depending on the relative size of the tankers, to minimize damage to the environment. However, it is generally necessary that any such offloading operation be installed and begin operation within a short period such as one or two days. Conventional techniques for installing mooring and cargo transfer terminals require considerable time to bring the components to the site, and normally require good weather to complete the installation. Another type of situation that can arise is in supplying fuel to personnel at an undeveloped or hostile shore environment, by utilizing a tanker moored to such an offshore installation to deliver oil through a seabed pipeline to a landbased storage tank, such as to support forces in a military operation. Again, it is necessary that the parts of the system be rapidly brought to the site and rapidly deployed there at with use of a minimum of personnel and equipment. A mooring and cargo transfer system which could be rapidly deployed to an offshore site, using a minimum of vessels and personnel to bring the system to the site and to install it there at, and which enable such installation even in relatively adverse weather conditions, would have considerable value in a number of emergency-like situations.

SUMMARY OF THE INVENTION

In accordance with one embodiment of the present invention, a mooring and oil transfer system is provided, which can be brought to an offshore site and installed there at, using a minimum of equipment, personnel, and time. The system includes a barge having a hull which is buoyant and seaworthy, but which can be flooded to sink it to the sea floor so it can be utilized as an anchor there at. The barge comprises a fluid swivel which includes a stationary swivel portion fixed to the barge and having a pipe coupling that can be connected to a seabed pipeline. The fluid swivel also includes a rotatable swivel portion which has a pipe coupling positioned to connect to a hose structure that extends up to the sea surface. The barge also can carry a mooring buoy and a long chain having one end connected to the buoy and an opposite end connected to the barge at the center of rotation of the fluid swivel.

The installation can be made by towing the barge to the site where it is to be sunk. The pipeline which is to connect to a distant location such as an abandoned tanker or a shore-based storage tank, can be connected to the barge and the barge utilized to tow out and lay the pipeline. The pipeline end is connected to the barge before the barge is sunk, so that undersea divers are not needed to perform this task. The hose structure which is to carry oil between the vessel and the fluid swivel on the barge is also connected prior to sinking of the barge. The barge is flooded to sink it, and the buoy and chain connected to the barge are automatically deployed during sinking. Thus, when the barge has sunk, the seabed pipeline, the hose structure, and the buoy are all connected to the barge. The fact that all elements of the system can be transported in a single barge, and that the barge itself can be utilized to lay the pipeline, means that the system can be easily transported and installed using a single towing vessel and a minimum of personnel who are stationed only at the sea surface.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
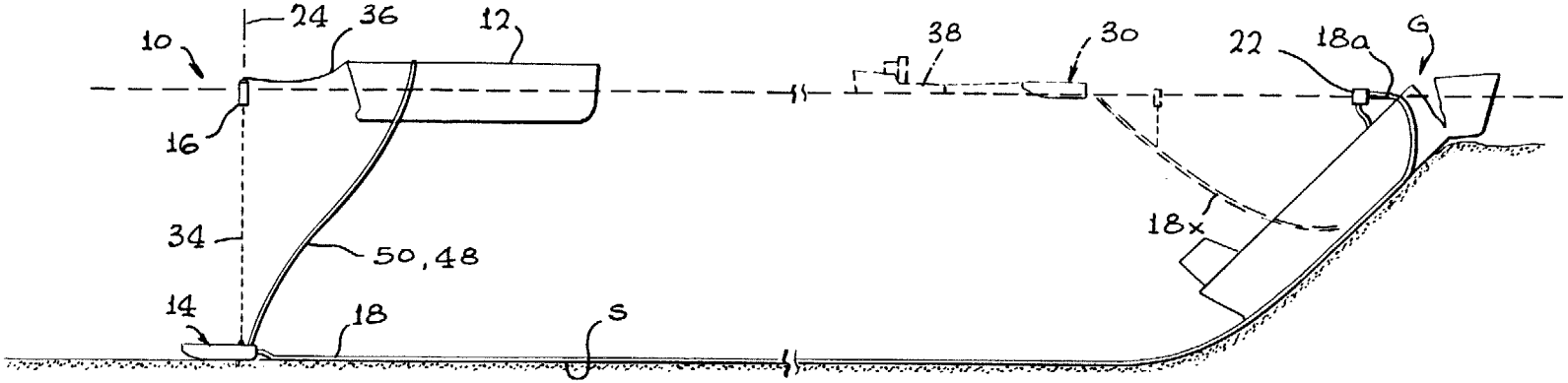
FIG. 1 is a side elevation view of a deployed mooring and cargo transfer system constructed in accordance with the invention.

FIG. 1 illustrates an emergency mooring and cargo transfer system 10 which is utilized to transfer oil or other hydrocarbons from a grounded tanker G which may leak oil into the sea, to an offloading vessel 12. The system includes a barge 14 which anchors a buoy 16 connected to the vessel. The barge also connects a seabed pipeline 18 to a riser hose structure 50 that extends up to the vessel. The pipeline 18 extends along the seabed S, and has an end 18a connected to the ground vessel G to receive oil therefrom. The oil may be pumped out by a pump 22 near the grounded vessel, and the pumping may be aided by pumps on the oil-receiving vessel 12.

The removal of oil from a grounded and breaking-up vessel typically must be conducted under emergency conditions. A delay of more than a few days in setting up an oil removal installation can greatly increase the chance of loss of the oil and pollution of the surrounding sea. Since it can require several days to pump all of the oil out of the grounded vessel G, the offloading vessel 12 and other similar offloading vessels, must be safely moored for each of several days in a manner that permits the continuous transfer of oil, despite poor weather conditions which might have caused the grounding of the vessel G in the first place. In a typical installation, the grounded tanker G may have a capacity of perhaps six times available offloading vessels such as vessel 12 and it may require about twenty-four hours to fill each offloading vessel. Accordingly, in such a situation, successive off-loading vessels may have to be moored during a six day period. The installation 10 is constructed to hold the vessel 12 in approximate location so it cannot drift more than a limited amount away from the vertical axis 24 of the installation which passes through the barge 14, while permitting the vessel 12 to drift so as to rotate without limit about the axis 24 under the influence of waves, currents, and winds.

Figure 3:
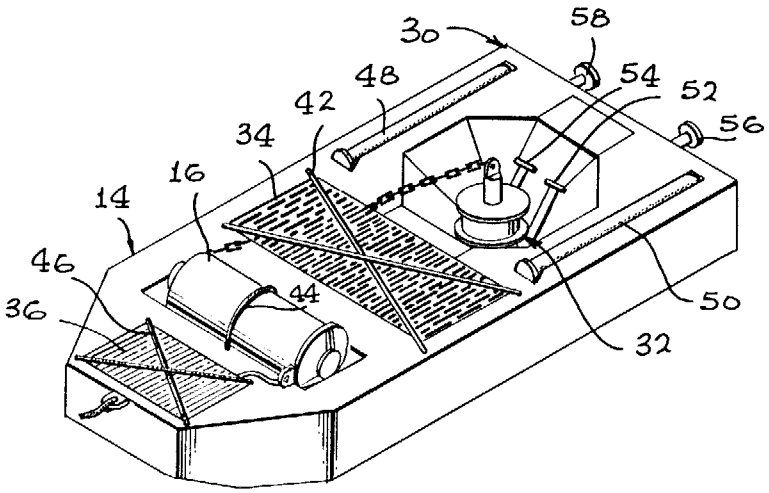
FIG. 3 is a partial perspective view of the system of FIG. 2, shown prior to deployment of the salm barge thereof.
Figure 2:
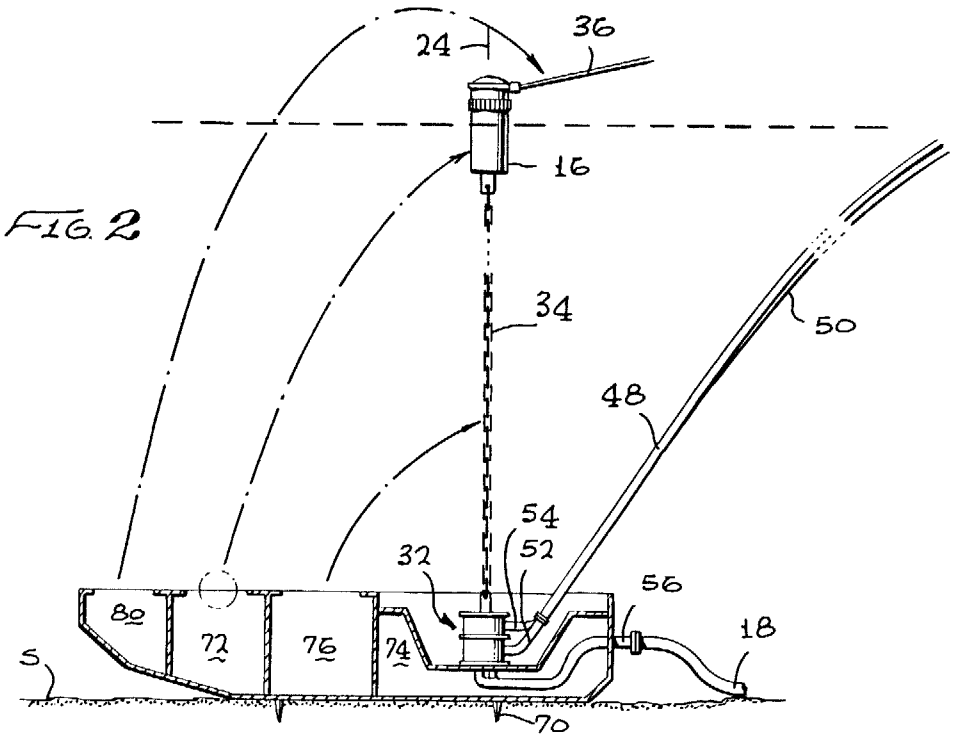
FIG. 2 is a partial sectional side elevation view of the system,, of FIG. 1.

The set up of the installation 10 is accomplished by the use of a barge assembly 30, such as is shown in FIG. 3. The barge assembly 30 includes the barge 14 which forms a seaworthy hull that can be towed to a desired location. The assembly also includes substantially all of the components of the installation needed to connect the seabed pipeline to a storage vessel. These components include a fluid swivel 32 which will remain on the barge when it is sunk, the buoy 16, a chain 34 or other line which can hold the buoy to the sunken barge, and a mooring hawser 36 which can connect the buoy to the storage vessel. The barge assembly 30 can be maintained in a ready state, with all the components in place, so that it can be quickly utilized in an emergency. When needed, the barge can be towed to the region where it is to be utilized.

FIG. 1 shows, in phantom lines, a first step in the utilization of the barge assembly 30, wherein it is utilized to lay the undersea pipeline at 18X. The pipeline at 18X is connected at one end to the vessel G (or to the pump 22), and at the other end to the barge assembly 30. A vessel 38, which may be a tug boat is then utilized to pull the barge assembly 30 until it is over a deeper portion of the sea where an offloading vessel can be safely moored. While the barge assembly is pulled, it pulls out the flexible pipeline 18X. When the assembly 30 is at the desired location, as over the vertical axis 24, tie downs shown at 42, 44, 46 are released to permit deployment of the chain 34, buoy 16, and mooring line 36. Hose structure 48, 50 stored on the barge assembly are removed and connected to hose structure couplings 52, 54 on the fluid swivel 32. The seabed pipeline may include two flexible pipes or hoses that will already have been connected to a pair of pipeline couplings 56, 58 of the fluid swivel 32.

Figure 4:
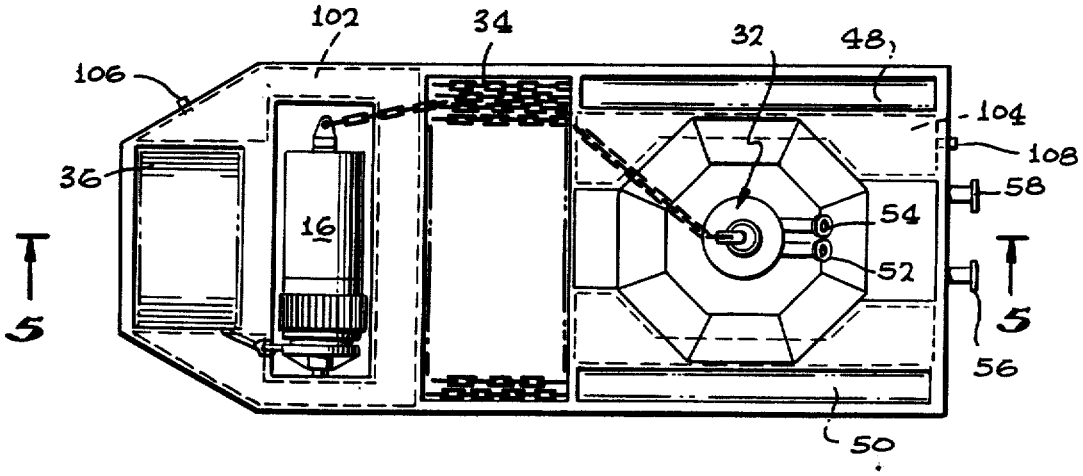
FIG. 4 is a plan view of the salm barge of FIG. 3.

After the components have been released from the tie down and connections have been made, stop cocks (not shown) can be opened on the barge 14 to flood chambers thereof so that the barge sinks in a controlled manner in the water. During sinking of the barge, the chain 34 automatically deployed, as are the hose structures 48, 50. The hose structures are of a floating type whose ends will float on the water surface, so that connections to a vessel can be accomplished by picking up the mooring line 36 and the upper ends of the hose structures 48, 50 and connecting them to the vessel. Additional delayed flooding chambers 102 and 104 are provided (FIG. 4) at the front and rear of the barge, and delayed opening valves 106, 108 are provided that open only after the barge has substantially reached the sea bottom, such as after a predetermined delay. The additional negative buoyancy resulting when these chambers 102, 104 are flooded, helps to install the spikes 70 and later resist mooring forces, without causing excessively rapid sinking which could cause damage.

Figure 5:
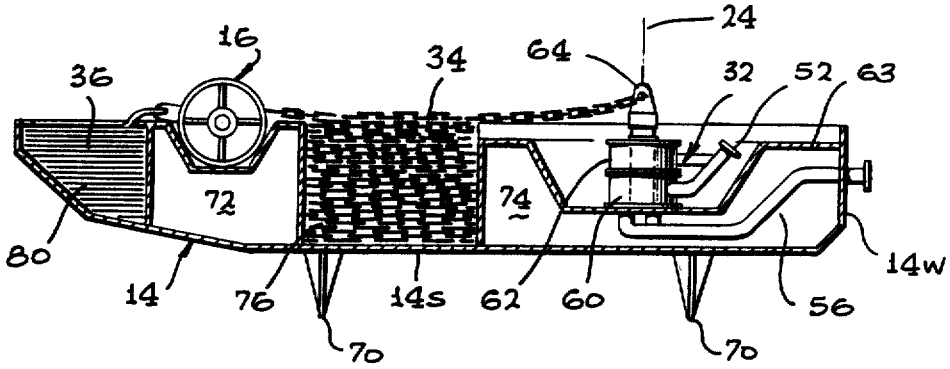
FIG. 5 is a view taken on the line 5–5 of FIG. 4.

As shown in FIG. 5, the fluid swivel 32 has a stationary portion 60 fixed to the barge 14 and a rotatable portion 62 which can rotate without limit about the vertical axis 24. It can be seen that the fluid swivel 32 lies at about the same level as the hull, that is no part of the swivel extends above the hull by more than the width of the hull, so that the barge with the fluid swivel thereon is seaworthy to enable it to be towed a long distance to the site where it is to be sunk. The stationary fluid swivel portion 60 includes the pipeline coupling 56, which extends in a largely horizontal direction through a hull wall 14w to connect to the largely horizontal seabed pipeline 18. The rotatable fluid swivel portion 62 includes the hose structure coupling such as 52 which connects to one of the hose structures such as 50 that extends with a vertical directional component towards the offloading storage vessel 12 at the sea surface. A wall 63 separates the couplings 52, 56 to prevent a drooping hose structure connected to the coupling 52 from snagging on the lower stationary coupling 56. A connector 64 extends through the center of the fluid swivel, along the vertical axis 24, and is connected to the anchor chain 34 that holds the buoy 16.

The barge hull has a largely horizontal lower surface 14s and has four spikes 70 which can press into the seabed to help anchor the barge in place. If desired, preinstalled ballistically driven piles can be utilized on the barge to more securely anchor it in place. At considerable depths such as over 100 feet, a barge at the sea floor will be largely isolated from surface currents that would otherwise tend to lift and move it. After an installation is completed, it is possible to recover the barge, as by pumping air into compartments 72, 74, 102 and 104 thereof to float it.

By providing all of the major components of the mooring installation on a single barge, movement of the components to the desired installation region is simplified. The use of the barge to install the sea bed pipeline, the connection of the pipeline to the barge prior to sinking of the barge, and the connection of the hose structures to the barge prior to sinking, avoids the needs for divers to complete the installation, or at least can minimize the required time of a diver where other tasks must be performed. The heavy mooring buoy 16 required to reliably moor a large vessel, can be deployed by merely sinking the barge from under it. The chain 34 is installed in a compartment 76 of the barge in a manner to insure reliable deployment of the chain. The buoy 16 is held in another compartment 78 in a manner to permit it to float away from the barge after release of the tie downs and upon partial sinking of the barge. The hawser 16, which is held in another compartment 80 is released to float on the water surface during sinking of the barge.

Figure 6:
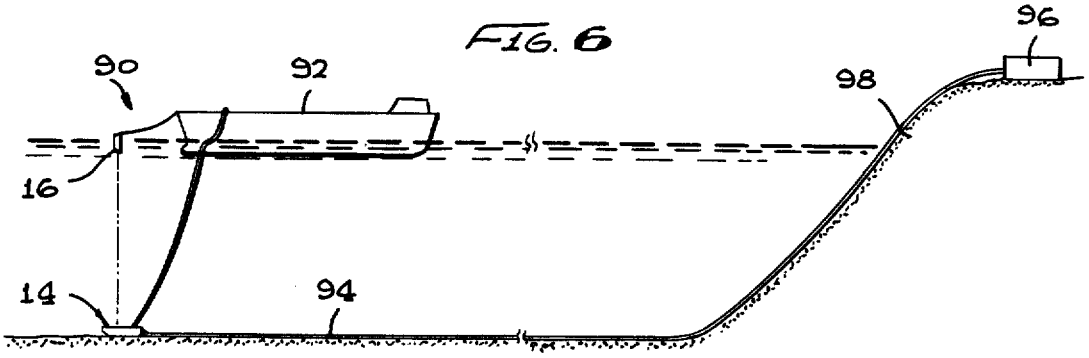
FIG. 6 is a side elevation view of a mooring and cargo transfer system of the invention, shown utilized in another application.

FIG. 6 illustrates a mooring installation 90 similar to that of FIG. 1, except that it is utilized to deliver oil from a tanker 92 through a pipeline 94 that extends to a shore-based storage tank 96. The installation can be emplaced by utilizing a tug boat that tows the barge assembly, to back up the barge assembly to the shore at 98, where connections are made to the pipeline 94. The barge then can be utilized to tow out the pipeline to the desired mooring location. The barge assembly then can be sunk, as in the case of the barge assembly of FIG. 1.

Thus, the invention provides an offshore mooring and cargo transfer system which can be rapidly moved to a desired site and installed thereat, in a minimum amount of time and utilizing a minimum of ships and personnel. This can be accomplished by utilizing a barge assembly which includes a seaworthy hull that holds a fluid swivel that can rotate about a vertical axis, and which also includes an anchoring chain connector that can hold an anchoring line or chain that extends vertically along the same axis of rotation to hold a buoy at the sea surface. The fluid swivel has a stationary coupling positioned to connect to a seabed pipeline, by locating it under the rotatable coupling, and has a rotatable coupling positioned to connect to a hose structure that extends up to the sea surface to connect to a vessel. The barge assembly can be towed as a self-contained unit to the desired mooring site, and even can be utilized to help lay the undersea pipeline. At the mooring site, with the undersea pipeline connected to the stationary coupling of the fluid swivel, the barge is flooded so that it sinks to the bottom, and with the undersea pipeline, the riser hose structure, and the buoy-holding chain already connected thereto.

Although particular embodiments of the invention have been described and illustrated herein, it is recognized that modifications and variations may readily occur to those skilled in the art and consequently, it is intended that the claims be interpreted to cover such modifications and equivalents.

The embodiments of the invention in which an exclusive property or privilege is claimed are defined as follows:

1. A rapidly deployable mooring and hydrocarbon transfer system for transferring hydrocarbons between a seabed pipeline and a floating offloading vessel at the sea surface, comprising:

a barge having a hull which is buoyant and seaworthy but which can be flooded and sunk and which has a lower surface formed to rest stably on the sea floor, and which has means for anchoring it to the seabed;

a fluid swivel assembly including a stationary swivel portion which is mounted on said barge and which has a first coupling positioned to connect to a largely horizontal seabed pipeline, and including a rotatable swivel portion which has a second coupling positioned to connected to a largely upwardly-extending hose structure that can connect to the offloading vessel, to maintain such connection during unlimited rotation of the vessel, all of said fluid swivel assembly lying at about the same level as the hull of said barge so that the barge with the fluid swivel assemly thereon is seaworthy;

said barge including a buoy with hawser connecting means for connecting to one end of a hawser whose opposite end moors a ship said buoy releasably mounted on said barge, a mooring line chamber, and a mooring line having a majority of its length stored in said chamber and a first line end connected to said barge along the axis of said swivel assembly and a second end connected to said buoy, whereby to enable automatic deployment of a connected buoy upon sinking of the barge.

2. The system described in claim 1 wherein:

said barge has a largely horizontal lower surface, and said anchoring means includes spike means extending below the hull for anchoring into the seabed.

3. A method for installing a mooring and fluid transfer system for mooring a ship and transferring fluid to or from the moored ship, comprising:

simultaneously towing a barge containing a fluid swivel and an end of a pipeline, to a desired offshore location;

connecting one end of a hose structure to a rotatable portion of the fluid swivel, and establishing said end of the pipeline in connection with a nonrotatable portion of the fluid swivel;

mounting a buoy on said barge, mounting a flexible line on said barge which is long enough to reach substantially from the seabed to the sea surface at said offshore location, releasing said buoy and line from attachment to said barge, and sinking said barge with the pipeline end and hose structure end attached thereto, in a controlled manner under said buoy and deploying said flexible line from said barge; and extending a hawser between said buoy and a ship, and connecting said hose structure to said ship.

*4. A rapidly deployable mooring and hydrocarbon transfer system for transferring hydrocarbons between a seabed pipeline and a floating offloading vessel at the sea surface, comprising:*

*a barge having a hull which is buoyant and seaworthy but which can be flooded and sunk and which has a lower surface formed to rest stably on the sea floor;*

*a fluid swivel assembly including a stationary swivel portion which is mounted on said barge and which has a first coupling positioned to connect to a largely horizontal seabed pipeline, and including a rotatable swivel portion which has a second coupling positioned to connect to a largely upwardly-extending hose structure that can connect to the offloading vessel, to maintain such connection during unlimited rotation of the vessel, all of said fluid swivel assembly lying at about the same level as the hull of said barge so that the barge with the fluid swivel assembly thereon is seaworthy;*

*said barge including a buoy with hawser connecting means for connecting to one end of a hawser whose opposite end moors a ship, said buoy releasably mounted on said barge, and a mooring line having a majority of its length stored on said barge and a first line end connected to said barge along the axis of said swivel assembly and a second end connected to said buoy, whereby to enable automatic deployment of a connected buoy upon sinking of the barge.*

*5. A method for installing a mooring and fluid transfer system for mooring a ship and transferring fluid between the moored ship and a pipeline beneath the ship, comprising:*

*towing a barge containing a fluid swivel to a desired offshore location;*

*mounting a buoy on said barge, mounting a flexible line on said barge which is long enough to reach substantially from the seabed to the sea surface at said offshore location, releasing said buoy and line from attachment to said barge, and sinking said barge in a controlled manner under said buoy and deploying said flexible line from said barge;*

*extending a hawser between said buoy and a ship; and connecting one end of a hose structure to a rotatable portion of the fluid swivel and the other end to said ship, and establishing a connection between said pipeline and a nonrotatable portion of the fluid swivel.*

*6. A method according to claim 5 additionally comprising recovering said barge from the seabed at a later time by increasing its buoyancy so as to cause it to rise to the surface of the sea.*

* * * * *